(12) United States Patent
Tabirian et al.

(10) Patent No.: US 6,728,049 B1
(45) Date of Patent: Apr. 27, 2004

(54) UNIVERSAL OPTICAL FILTER HOLDER

(75) Inventors: Nelson Tabirian, Winter Park, FL (US); Uladzimir Hrozhyk, Maitland, FL (US); Svetlana Serak, Maitland, FL (US)

(73) Assignee: Beam Engineering for Advanced Measurements Co., Winter Park, FL (US)

( * ) Notice: Subject to any disclaimer, the term of this patent is extended or adjusted under 35 U.S.C. 154(b) by 0 days.

(21) Appl. No.: 10/401,388

(22) Filed: Mar. 31, 2003

(51) Int. Cl.[7] .............................. G02B 5/22; G02B 7/00
(52) U.S. Cl. ........................................ 359/892; 359/819
(58) Field of Search ................................ 359/892, 819, 359/821, 896, 822; 248/476, 482, 488, 496; 351/107; 353/100, 101

(56) References Cited

U.S. PATENT DOCUMENTS 5,446,596 A * 8/1995 Mostrorocco ............... 359/827

OTHER PUBLICATIONS

"Optics Guide 5", Melles Griot, pp. 23–4, 23–6 (1990).*

* cited by examiner

*Primary Examiner*—Drew Dunn
*Assistant Examiner*—Leo Boutsikaris

(57) ABSTRACT

The objective of the present invention is providing a mechanical holder that allows optical filters, wave plates, and substrates of different shapes, sizes, and thickness to be simply, conveniently, flexibly, and quickly mounted, fixed and interchanged. This is achieved using grooved plates combined into a split-V-shaped configuration with variable separation and angle between the plates.

4 Claims, 7 Drawing Sheets

UNIVERSAL OPTICAL FILTER HOLDER

CROSS-REFERENCES

[1] Multiple filter holders, in Melles Griot Product Catalog 1999, p. 24.11.
[2] 12800 Multiple filter holder, in The Book of Photon Tools, Oriel Instruments 1999, p. 18–7.
[3] Filter and optic holders, in Optics and Mechanics 1999/2000 Catalog, Newport p. 13–57 and 13–59.
[4] multiple filter mounts, in Optics and Optical Instruments Catalog 2002, Edmund Scientific p. 127.

BACKGROUND OF THE INVENTION

This invention is aimed at improvement of mechanical holders, which are used for securing and maintaining optical elements such as filters, plates, mirrors, or other similar objects, precisely in a particular position with respect to alignment, and replacement of such elements without loss of that alignment.

In the fields of optics and lasers it is necessary to hold the optical elements precisely aligned along the path of a light beam. Typically, optical holders must hold a plurality of optical elements having different shapes and diameters at a needed position and, at the same time, they have to allow optical elements to be quickly interchanged. For the sake of brevity, only filters are discussed throughout the rest of this specification, it being understood that the same considerations discussed herein are also applicable to other optical elements such as wave plates, mirrors, beam splitters, and so forth.

Optical filter holders known presently are capable of holding filters having a relatively small range of diameters or rectangular shape dimensions. Hence, several separate holders of various sizes must be used for any practical work with optical and laser systems.

For example, the filter holders presented in the product catalog of Melles Griot Corporation, published in 1999, page 24.11, are specifically for 1" or 2" filters only. Filters of other sizes can not be positioned in those holders in a stable manner since they will be hold in position by touching the semi-circular grooves of the filter holder in two points only. This is demonstrated in FIG. 1. The holder 10 has a semicircular shape with a trench 30 at the bottom part to accommodate the tips of rectangular holders. The dashed line 20 in FIG. 1 indicates the depth of the grooves. The diameter of the circular filter 40 is smaller than the diameter of the filter holder 10 and therefore the filter is equilibrated only due to touching the base of the holder in two points. The diameter of the circular filter 60 is larger than the diameter of the holder 10, and therefore it is equilibrated by touching the two edges of the filter holder. If the rectangular filter 50 does not have sizes precisely related to the parameters of the holder, its equilibrium will also be supported in two points only. Since, the groove width shall be larger than the thickness of the filters, only filters of precisely predetermined shape are stable in such a holder.

Similarly, Newport Corporation in its Catalog for 1999/2000, page 13–57, offers two filter holders, one for a single or a stack of 2" square filters, and the second one for holding a single or two round 2" diameter filters.

Adjustable lens holders similar to those shown in Melles Griot Catalog (p. 23-4 and 23-6) can be used for holding both spherical and cylindrical lenses of different sizes. These lens holders require a vertical cross bar assembly, incorporating a central thumbscrew, to hold the lens in its position. Changing a lens in such a holder would require using both hands of the user: one for loosening the thumbscrew, and one for holding the lens. Whereas this is acceptable for lenses, it is not convenient for filers, which are replaced very frequently in most optical setups. The vertical posts that keep together the bottom grooved plate and the vertical cross bar restrict the access to the filter in a single holder and eliminate access to the filters in case such holders are combined in a row for holding multiple filters. Adaptation of such a lens holder for holding multiple filters would require multiple mounting posts increasing the sizes, the weight and the cost of such an element.

A multiple lens holder that allows easy access to each individual lens is disclosed in the U.S. Pat. No. 5,446,596 to Mostrorocco. However, the capability of holding multiple lenses with easy access to each individual lens is achieved in the device disclosed in the U.S. Pat. No. 5,446,596 by positioning the lenses side by side in pairs. Such a positioning is adequate for the procedure of tinting ophthalmic lenses discussed in the U.S. Pat. No. 5,446,596 to Mostrorocco, however, it is not useful for the purposes of controlling laser beams and for other physical optics applications and systems where it is necessary to hold the optical elements aligned subsequently along the propagation path of the light beam.

BRIEF SUMMARY OF THE INVENTION

In view of disadvantages of the prior art outlined above, it is the primary objective of this invention to provide an optical holder which allows to mount, align, and replace both rectangular and round optical filters, wave plates, substrates and other similar elements of different sizes quickly, without loss of alignment and with improved stability of positioning.

Another objective of the invention is to provide a filter holder with variable angle between the grooved side plates for centering the axes and improving the stability of filters of different sizes.

Further objectives and advantages of this invention will be apparent from the following detailed description of the preferred embodiment, which is illustrated schematically in the accompanying drawings.

DETAILED DESCRIPTION OF THE INVENTION

Before explaining the disclosed embodiment of the present invention in detail it is to be understood that the invention is not limited in its application to the details of the particular arrangement shown since the invention is capable of other embodiments. Also, the terminology used herein is for the purpose of description and not limitation.

Figure 1:
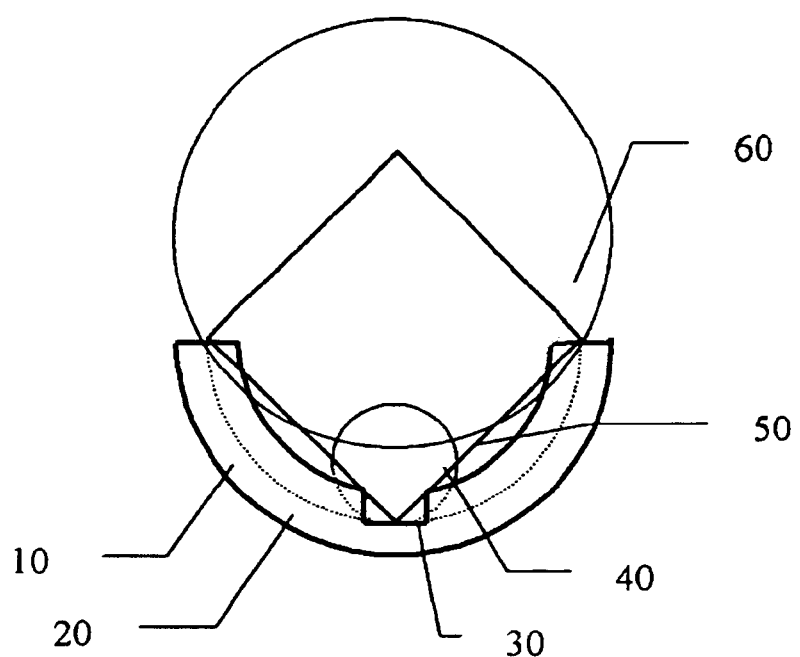
FIG. 1 shows a commercially available filter holder and reveals its limited capability for holding of filters of different sizes.
Figure 2:
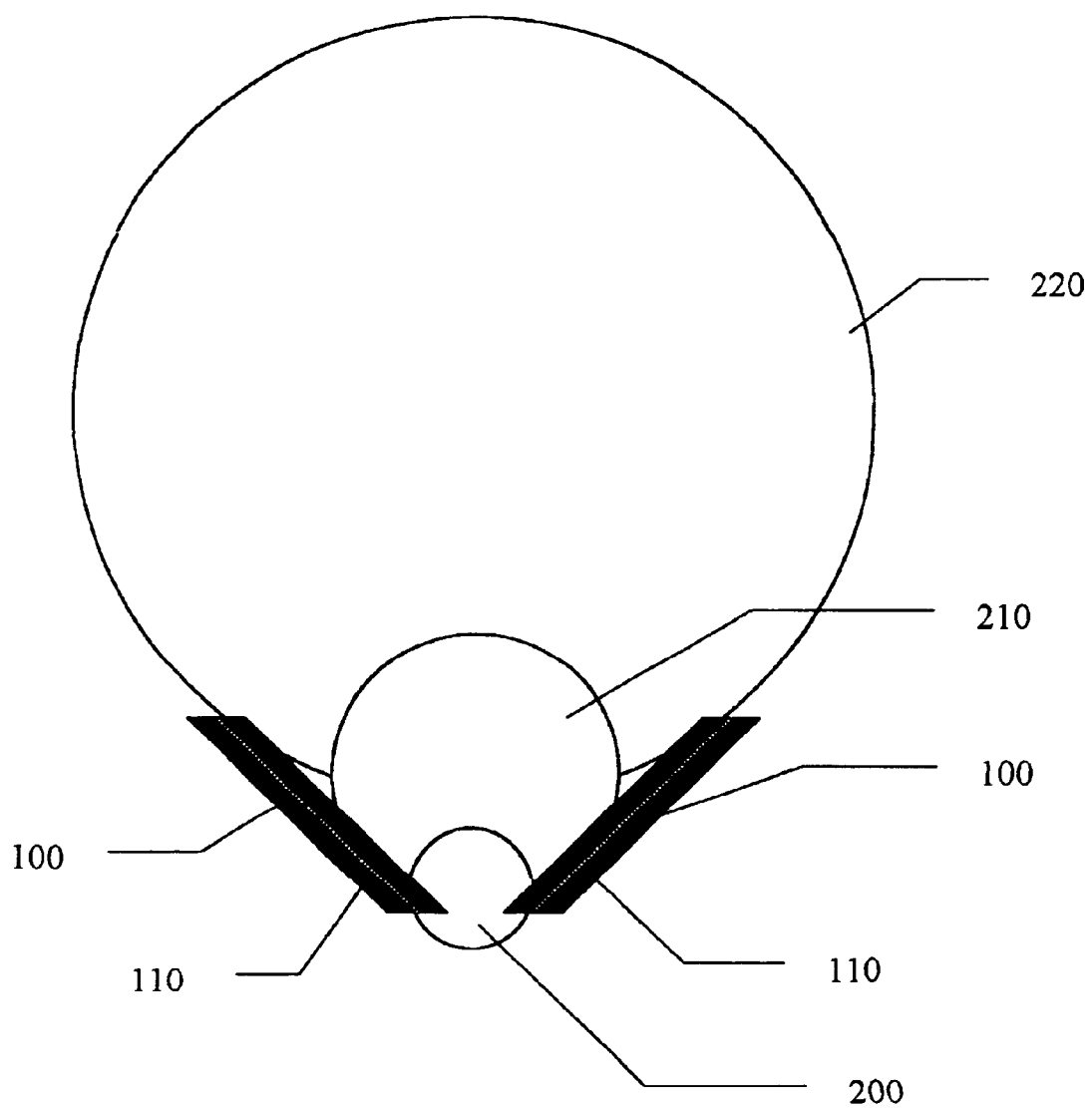
FIG. 2 shows the principal schematic of the universal filter holder according to the present invention and its capability of holding circular filters of different sizes.
Figure 3:
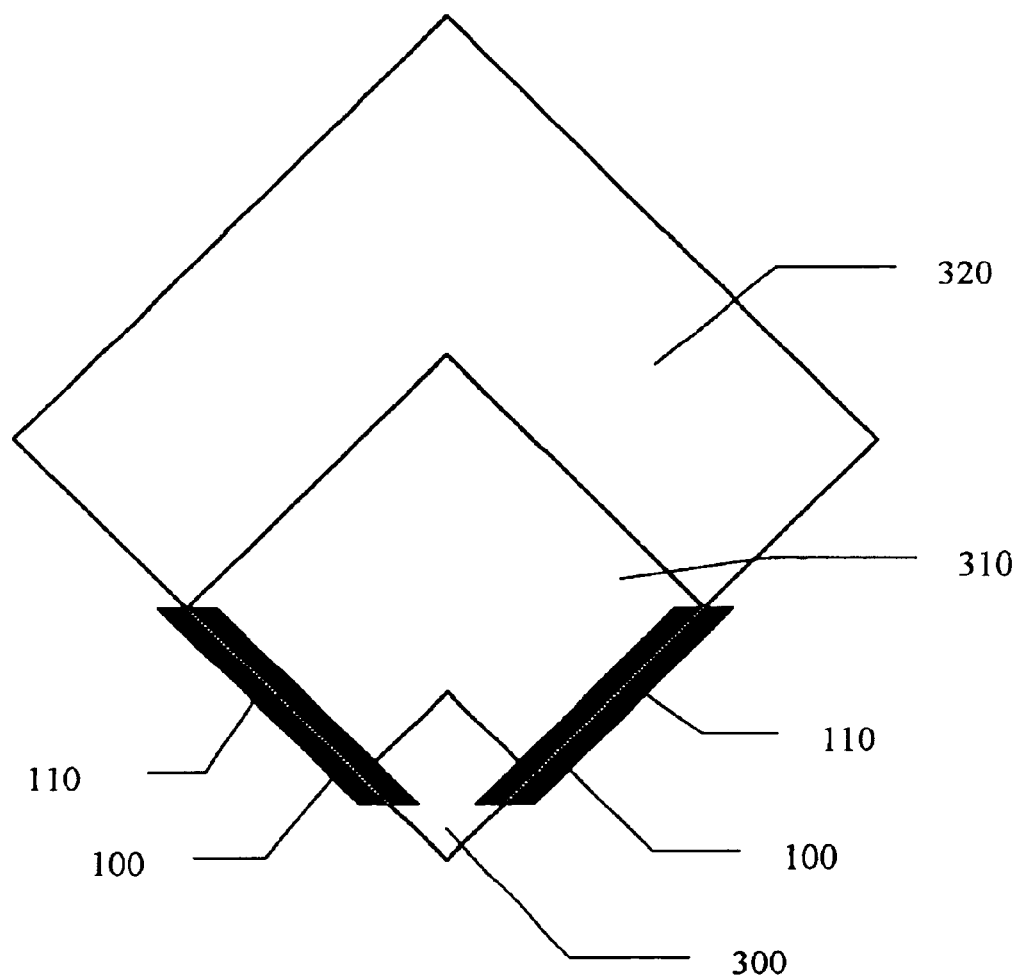
FIG. 3 shows the principal schematic of the universal filter holder according to the present invention and its capability of holding rectangular filters of different sizes.

The basic components of the filter holder of the present invention are two grooved side plates arranged at a predetermined distance and making an angle, preferably 90 degrees, with respect to each other. As shown in FIG. 2 and FIG. 3, such an arrangement can hold filters of different shapes and sizes while maintaining easy access to each individual filter for quick replacement. The distance between the grooved plates 100, the number of the grooves, the depth of the grooves indicated by the dashed lines 110 in FIG. 2 and FIG. 3, and their width can be varied and is chosen to correspond to the thickness of filters regularly used in optical instrumentation and research. The assortment of the groove widths on side plates can be optimized to support various typical thicknesses of optical filters, waveplates, polarizers, etc. In a preferred embodiment, the number of the grooves on the side plates is 12, with one groove 1.7 mm wide, 5 grooves 2.6 mm wide, 5 grooves 3.3 mm wide, and one groove 4.3 mm wide. FIG. 2 demonstrates the capability of the filter holder to hold circular filters of different sizes 200, 210 and 220, and FIG. 3 demonstrates the capability of the filter holder to hold square filters of different sizes 300, 310, and 320.

Figure 4A:
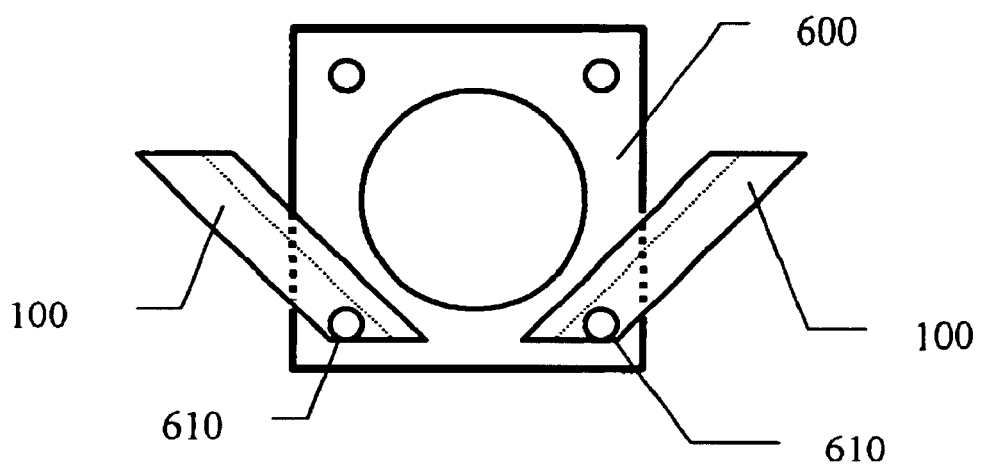
FIG. 4A shows a projection of a preferred embodiment of the universal filter holder mounted on a cage plate using extension rods.
Figure 4B:
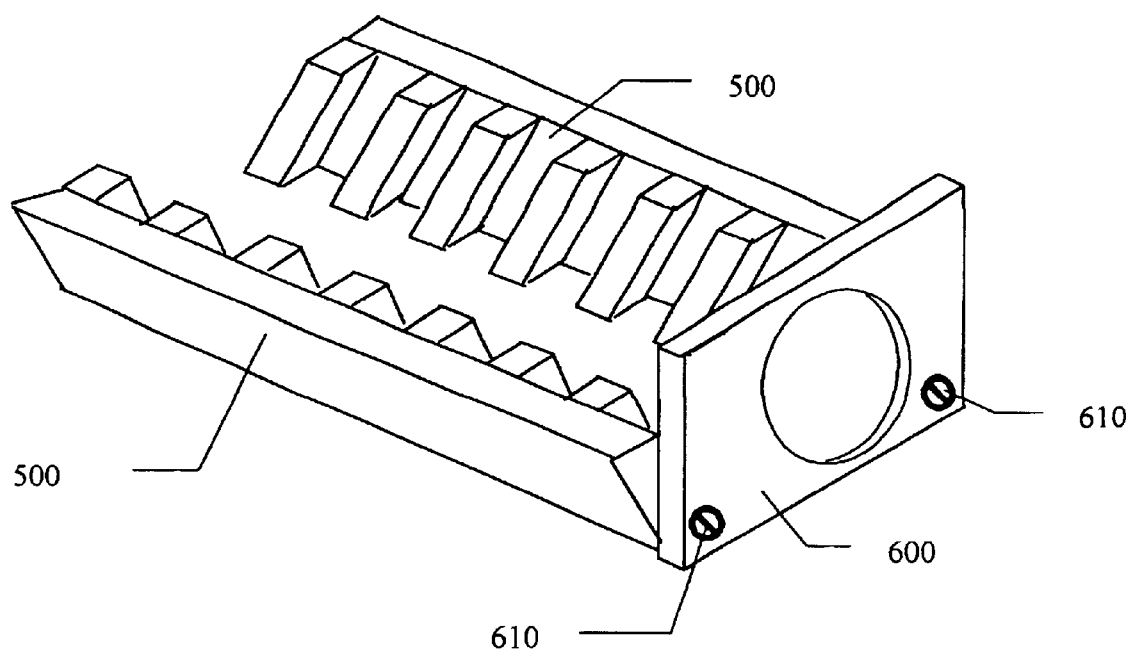
FIG. 4B shows a three-dimensional view of a preferred embodiment of the universal filter holder mounted on a cage plate using extension rods.
Figure 5:
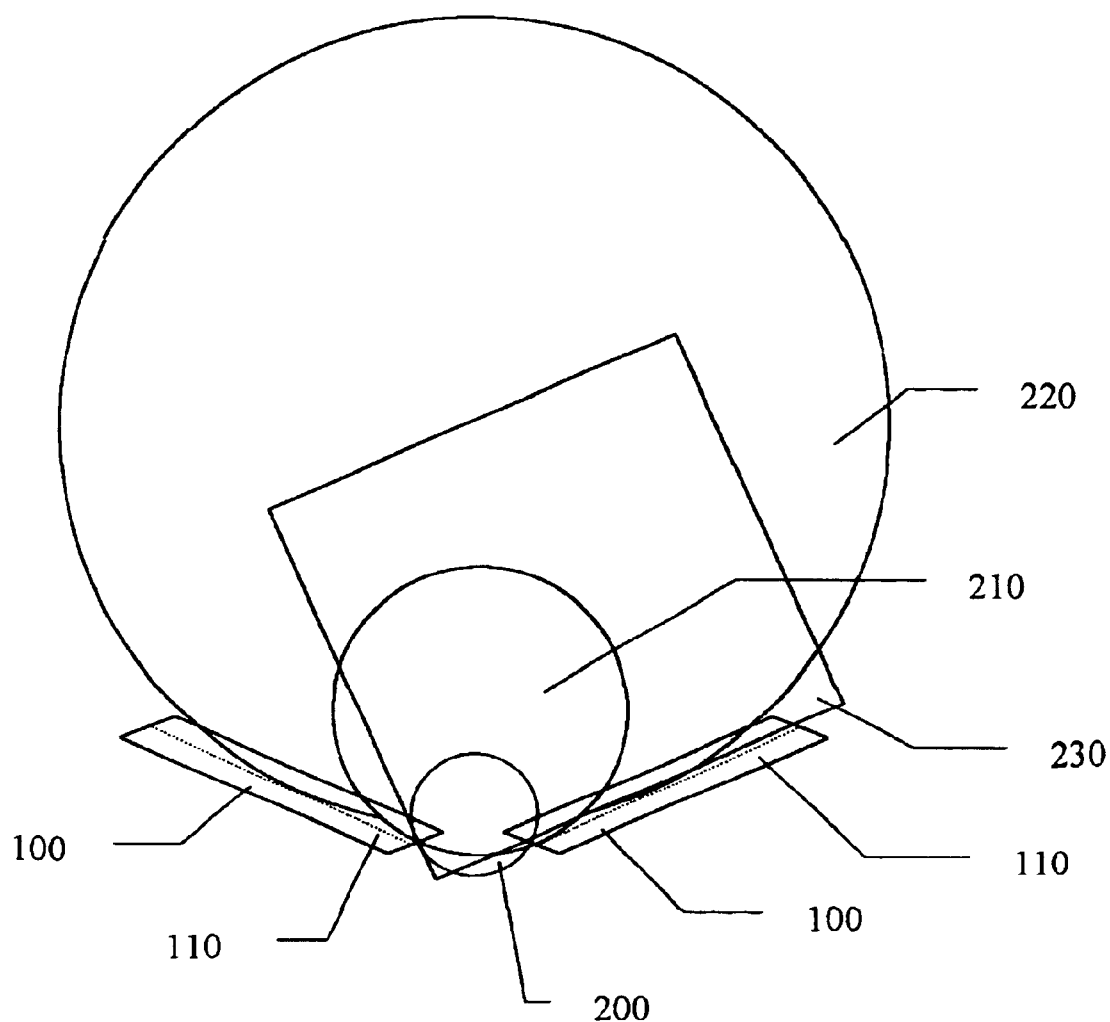
FIG. 5 shows the embodiment of the universal filter holder with the side plates making larger than 90 degrees angle with respect to each other for overlapping the field of views obtained by filters of different sizes.

In a preferred embodiment shown in FIG. 4, each of the grooved side plates 100 have a through hole 610 which allows them to independently be mounted on rods such as those used in cage assemblies 600 at a variable angle with respect to each other. In another embodiment, the grooved side plates are mounted between a front and back plates that have openings allowing propagation of light beams, said openings may or may not possess threads for attachment of other optical components such as lens holders. As shown in FIG. 5, the side plates 100 can be mounted at different angles to create overlapping field of views when using filters of different sizes and shapes 200, 210, 220, 230.

Figure 6:
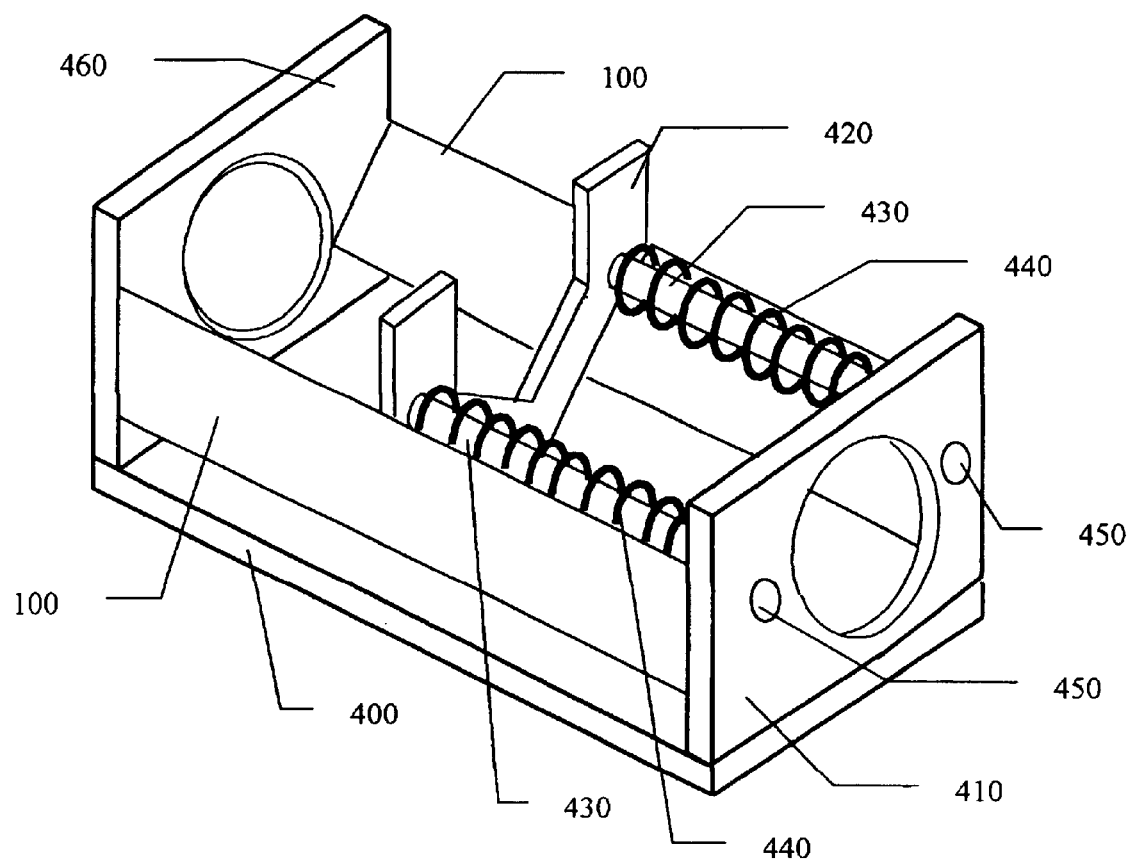
FIG. 6 shows the embodiment of the universal filter holder with a pressure plate for stabilizing the position of multiple filters or filters of different thickness in the holder.

The side plates can have, particularly, just one groove wide enough to support filters in a wide range of thickness or multiple filters. The position of the filters in such a holder, FIG. 6, can be fixed using a pressure plate 420 capable of sliding between the side plats 100. Said pressure plate 420 is mounted on pins 430 which are inserted into springs 440. The pins 430 can freely slide through openings 450 on the back plate 410.

The Universal Filter Holder, in accordance with the present invention, offers, among others, the following advantages:

1. It allows to mount, align, stack and replace both rectangular and round optical filters of different sizes, wave plates, substrates and other similar elements quickly, without loss of alignment and with improved stability of positioning.
2. It consists of two grooved side plates that can be mounted independently on cage plate assemblies through extension rods.
3. It is compact and versatile.
4. It provides access to the filters in the stack both from the top or the sides of the filters.

Although the present invention has been described above by way of a preferred embodiment, this embodiment can be modified at will, within the scope of the appended claims, without departing from the spirit and nature of the subject invention.

What is claimed is:

1. A holder for mounting and fixing of optical filters, plates, mirrors, polarizers or assemblies of such elements comprising:
   a. two side plates having a multitude of grooves with predetermined width, depth and distance between them;
   b. means for holding said side plates independently at a predetermined distance and angle with respect to each other that can be varied from larger than 0 to smaller than 180 degrees;
   c. means for mounting the assembly of said side plates on the path of light beams.

2. A holder as in claim 1 wherein said means for holding said side plates comprise a front plate that has a threaded hole for mounting it on a post and an opening for unobstructed propagation of light.

3. A holder as in claim 1, wherein said side plates have:
   a. through holes for insertion of rods;
   b. threaded holes for independently fixing and adjusting the position of said side plates on said rods using screws.

4. A holder for mounting and fixing of optical filters, plates, mirrors polarizers or assemblies of such elements comprising:
   a. side plates possessing a single wide groove for holding multiple filters;
   b. a front and a back plates for holding said side plates at a predetermined angle and distance from each other and with openings allowing propagation of light beams;
   c. a pressure plate capable of sliding between said side plates and possessing an opening for propogation of light beams;
   d. two parallel pins for holding and positioning said pressure plate between said side plates and capable of sliding through the openings in the back plate;
   e. springs positioned around said parallel pins between said pressure plate and said back plate.

* * * * *